United States Patent [19]

DeRome

[11] Patent Number: 4,888,980

[45] Date of Patent: Dec. 26, 1989

[54] APPARATUS AND METHOD FOR TESTING, FILLING AND PURGING CLOSED FLUID SYSTEMS

[76] Inventor: Raymond D. DeRome, 10401 - 336th Ave., Twin Lakes, Wis. 53181

[21] Appl. No.: 341,738

[22] Filed: Apr. 21, 1989

[51] Int. Cl.$^4$ .............................................. G01M 3/26
[52] U.S. Cl. ........................................ 73/49.2; 73/49.7
[58] Field of Search ................... 73/40, 49.2, 37, 49.7, 73/45.8

[56] References Cited

U.S. PATENT DOCUMENTS

| | | | |
|---|---|---|---|
| 2,679,747 | 6/1954 | Andrus | 73/40 |
| 3,122,668 | 2/1964 | Cuny | 73/40 |
| 3,623,372 | 11/1971 | Markey | 73/49.7 |
| 3,650,147 | 3/1972 | Moyer | 73/49.7 |
| 3,800,586 | 4/1974 | Delatorre et al. | 73/49.2 |
| 4,235,100 | 11/1980 | Branchini | 73/49.7 |
| 4,574,620 | 3/1986 | Cohl | 73/40.7 |
| 4,782,689 | 11/1988 | DeRome | 73/49.2 |

Primary Examiner—Hezron E. Williams
Attorney, Agent, or Firm—Andrus, Sceales, Starke & Sawall

[57] ABSTRACT

An evacuation unit for testing the fluid tightness of a closed fluid system, filling the system with system fluid, and/or purging the system fluid of entrained gas. The evacuation unit includes a source of system fluid, an air operated venturi vacuum pump, a hose for releasable and sealable connection to an access port of the closed fluid system, and a three way valve for selected positioning between a first position communicating the vacuum pump with the flexible hose system to produce a vacuum in the system, a second position isolating the flexible hose and system to test for fluid tightness, and a third position communicating the system fluid source with the flexible hose and system for filling the system through the access port with system fluid. Multiple reservoirs may be employed for filling the system with multiple fluids through the use of a reservoir sequence valve. The sequence valve permits filling the system by drawing liquid from multiple sources in a predetermined sequence. A method of testing the fluid tightness of the system and filling the system with system fluid without disconnecting the evacuation unit is also disclosed.

6 Claims, 3 Drawing Sheets

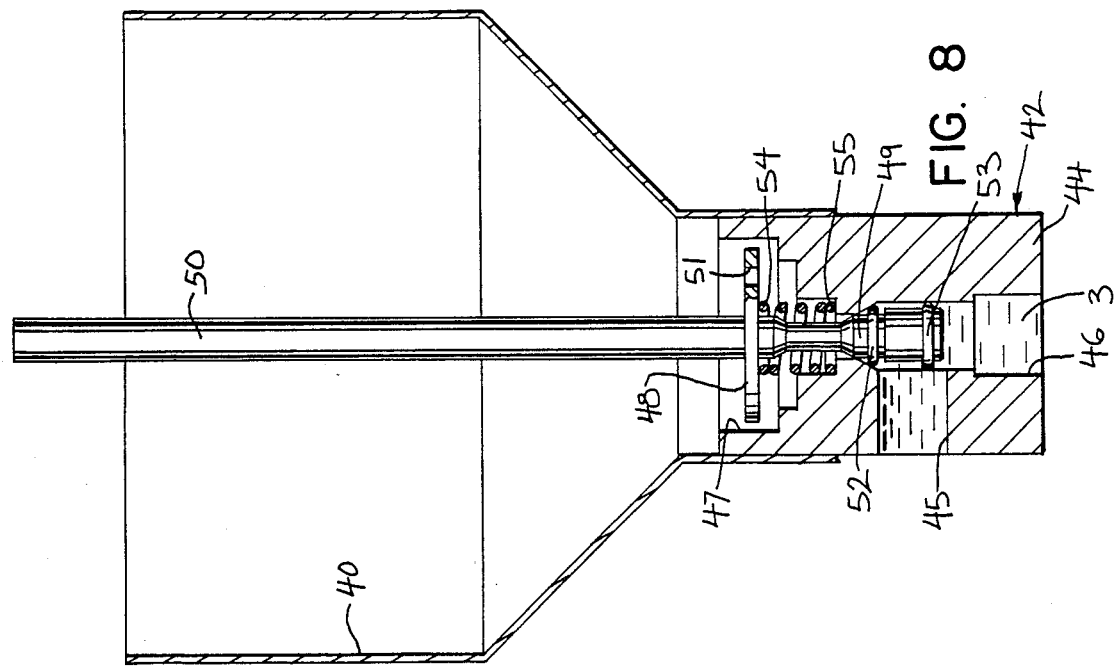
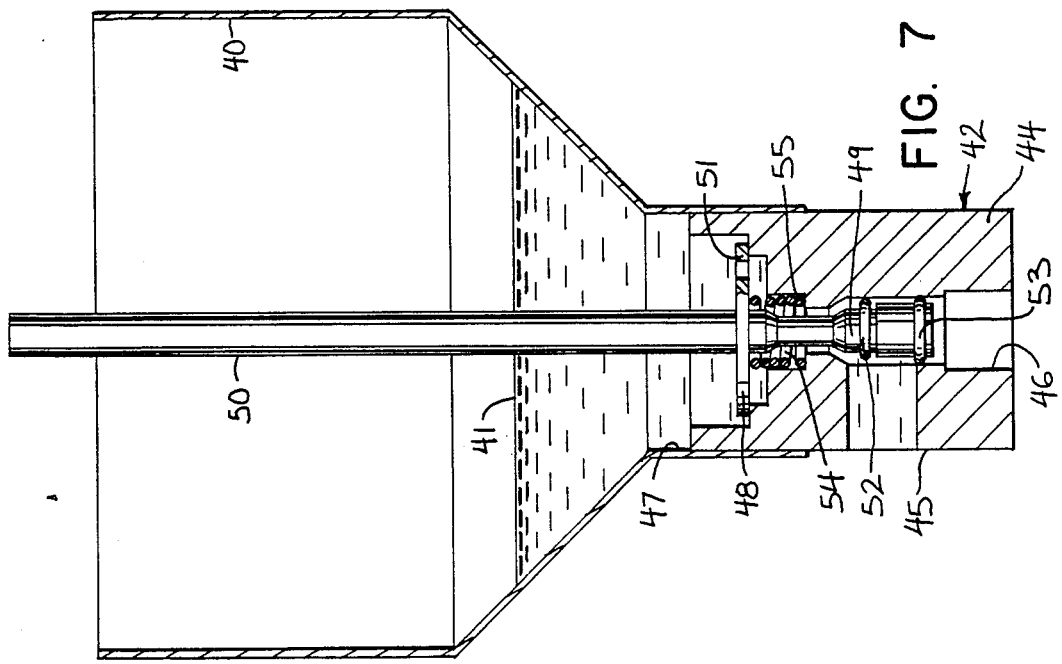

APPARATUS AND METHOD FOR TESTING, FILLING AND PURGING CLOSED FLUID SYSTEMS

BACKGROUND OF THE INVENTION

The present invention relates to testing closed fluid systems, and more particularly to an apparatus and method for testing, filling and purging entrained gas from closed fluid systems such as engine coolant systems.

Pressure testing the fluid tightness of closed fluid systems is primarily used in connection with automotive systems such as engine cooling systems, hydraulic brake systems, hydraulic clutch systems, hydraulic power steering systems, and air conditioning coolant systems. For example, most automotive internal combustion engines utilize a liquid cooling system comprising water and additives such as propylene glycol to maintain the engine within an optimum temperature range for operating efficiency. Such cooling systems generally employ a water pump which serves to circulate liquid coolant through flow paths located within the engine block where heat is transferred from the operating engine to the coolant, and then through a radiator where heat transfer occurs between the liquid and the atmosphere. With the advent of smaller engines having relatively high horsepower, more intricate cooling passages are necessary within the engine block. Additionally, the use of smaller radiators due to considerations of cost and sizing limitations, and higher operating temperatures for the engines results in a considerable amount of heat developed by the engine which must be dissipated through a relatively small radiator surface area. As a consequence, it is more important than ever to eliminate air pockets in the system as well as entrained air in the coolant so as to avoid "hot spots" from developing in the engine.

Since the cooling system of an automobile is designed to be a closed system, any minor leaks present in the flow path will reduce the efficiency of the system and may result in excessive coolant loss. As coolant is lost through leaks, the capability of the system to keep the engine temperature within an optimum range for operating efficiency is decreased, and if enough coolant is lost, overheating occurs with resultant damage to the engine. It is thus desirable that the cooling systems of internal combustion engines should be tested periodically on a regular basis in order to access the integrity of the system by detecting the presence of leaks, and filling the coolant system with fresh liquid coolant. Additionally, it is desirable to accomplish this testing and filling operation without creating air pockets in the system and without entraining a significant amount of air in the system fluid. This latter requirement is particularly advantageous with respect to the hydraulic fluid systems noted above relating to brake, clutch, and steering systems.

Various devices are known that are designed to test the fluid tightness of engine coolant systems, some examples are disclosed in the following United States patents:

| U.S. Pat. No. | Inventor | Issue Date |
|---|---|---|
| 3,207,254 | D'Espinassy De Venel | Sept. 21, 1965 |
| 3,623,372 | Markey | Nov. 30, 1971 |
| 3,650,147 | Moyer | Mar. 21, 1972 |

-continued

| U.S. Pat. No. | Inventor | Issue Date |
|---|---|---|
| 4,114,425 | Hicks | Sept. 19, 1978 |
| 4,235,100 | Branchini | Nov. 25, 1980 |
| 4,458,523 | Moyer | July 10, 1984 |
| 4,494,402 | Carney | Jan. 22, 1985 |
| 4,574,620 | Cohl | March 11, 1986 |
| 4,782,689 | DeRome | Nov. 8, 1988 |

It is also desirable in some circumstances to accomplish the filling operation by drawing liquid from multiple reservoirs in a predetermined sequence. This is typically desired, for example, when a specific amount of coolant additive is to be added to an automotive cooling system during filling. If both additive and coolant were drawn from a single reservoir, it would be possible that some additive would remain diluted in that single reservoir.

SUMMARY OF THE INVENTION

An evacuation unit for testing the fluid tightness of a closed fluid system having an access port and for filling the system with a system fluid through the access port without disconnecting the evacuation unit. The evacuation unit may also be employed to purge substantially all entrained air from a closed fluid system.

The evacuation unit includes a source of system fluid, vacuum pump means for producing a vacuum of a predetermined pressure less than atmospheric pressure, connection means for releasable and sealable connection to the access port of the closed fluid system, and valve means for selective positioning between a first position communicating the vacuum pump means with the connection means to produce a vacuum in the system, a second position isolating the connection means and system to test for fluid tightness, and a third position communicating the system fluid source with the connection means for filling the system with system fluid.

In one aspect of the invention, the vacuum pump means includes a source of fluid under pressure, a venturi, and conduit means interconnecting the pressurized fluid source and the venturi. The pressurized fluid is preferably air. The connection means preferably includes a flexible hose having a filler head on one end for attachment to the access port of the system and coupling means on its other end for attachment to the valve means.

In another aspect of the invention, the evacuation unit also includes a separation tank disposed between the vacuum pump means and the valve means so that system fluid drawn therein under vacuum separates into a liquid phase and a gas phase. This removes entrained gas, particularly air, from the system fluid when the valve means is in its first position. Thus, substantially all entrained air may be removed or purged from a closed fluid system such as an automotive coolant system, brake system, clutch system, power steering system, or air conditioning coolant system.

In still another aspect of the invention, a method of testing the fluid tightness of a closed fluid system having an access port includes the steps of draining the fluid system of the fluid therein, releasably and sealingly connecting an evacuation unit to the access port of the fluid system, actuating the evacuation unit to produce a vacuum in the system to a predetermined pressure less than atmospheric pressure, discontinuing application of the vacuum on the system, and observing any pressure increase that may occur. Preferably, the step of actuating the evacuation unit comprises applying a source of fluid under pressure, such as air, to the evacuation unit and passing the fluid through a venturi.

In still a further aspect of the invention, the system may be refilled with system fluid through the access port without disconnecting the evacuation unit. Refilling the system may be accomplished simply by connecting the evacuated system to a source of system fluid which is at atmospheric pressure. The differences in pressure thus force system fluid into the evacuated system. Additionally, in order to aid in refilling the system and to remove entrained air from the system fluid, the system may be disconnected during the initial filling from the source of system fluid and thereafter the evacuation unit may be reactuated to produce a vacuum on the system at a time prior to the system being completely filled with system fluid. Thereafter, reapplication of vacuum on the system is discontinued and then the evacuated system is reconnected to the source of system fluid to fill the remainder of the system with system fluid.

Multiple reservoirs may be employed for filling the system with multiple fluids through the use of a reservoir sequence valve. The sequence valve permits filling the system by drawing liquid from multiple sources in a predetermined sequence.

Other features and advantages of the invention will become apparent to those skilled in the art upon reviewing the following detailed desription, the drawings, and the appended claims.

BRIEF DESCRIPTION OF THE DRAWINGS

The drawings illustrate the best mode presently contemplated of carrying out the invention.

In the drawings:

FIG. 7 is a cross sectional enlarged side view in elevation of the reservoir sequence valve shown in its depressed position communicating a primary reservoir with a fill head; and FIG. 8 is a view similar to FIG. 7 except showing the sequence valve in its raised position communicating a secondary reservoir with the fill head.

DESCRIPTION OF THE PREFERRED EMBODIMENT

Figure 1:
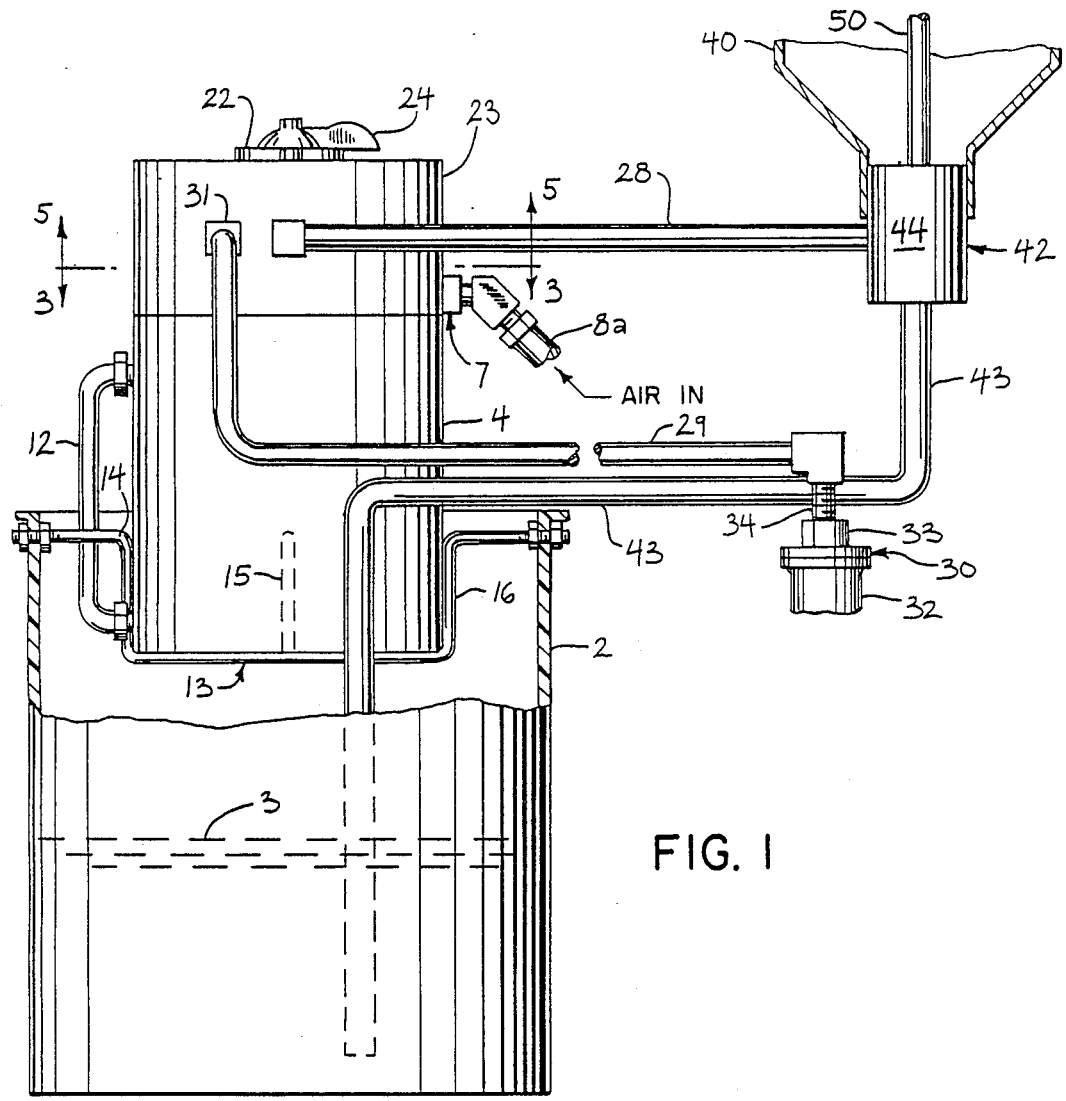
FIG. 1 is a side view in elevation with parts broken away illustrating an evacuation unit constructed in accordance with the principles of the present invention.

Referring now to the drawings, there is illustrated an evacuation unit, generally designated by the numeral 1, for testing the fluid tightness of a closed fluid system, for filling the system with system fluid, and for purging the system of entrained gas such as air. The evacuation unit has its primary use in connection with automobile engine cooling systems and although unit 1 is illustrated, and will be described, in that environment, it will be apparent to those skilled in the art that unit 1 and the method disclosed herein may find suitable uses in other environments where it is desired to observe the pressure integrity of closed systems. In partiuclar, the purging of entrained air from closed systems finds its primary use in connection with automobile closed hydraulic fluid systems such as brake, clutch, power steering, and air conditioning systems.

Figure 2:
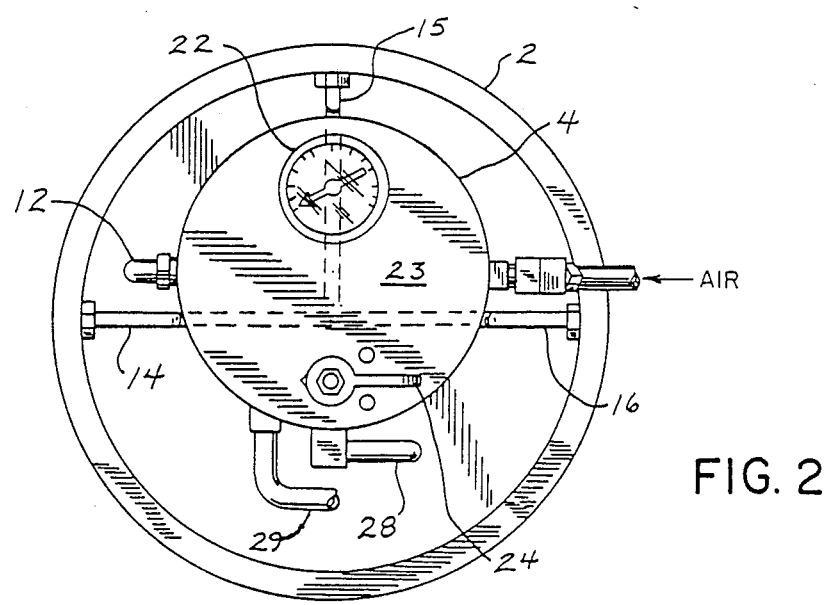
FIG. 2 is a top plan view of the evacuation unit of FIG. 1.

Referring now to FIGS. 1 and 2, evacuation unit 1 includes a primary reservoir 40 containing fluid 41 and a secondary reservoir 2 containing fluid 3. In particular, fluid 41 may comprise an automotive cooling system fluid which typically is composed of a mixture of water and propylene glycol, and fluid 3 may comprise a coolant additive such as a rust inhibitor. Reservoirs 40 and 2 are conventional open top containers composed of any non-corrosive material such as a plastic material. Typically, reservoir 2 has a height sufficient to contain a sufficient amount of fluid 3 at its bottom for use in filling the coolant system of an automobile, and yet, as will be described hereinafter, maintain a separation tank 4 therein at a sufficient height to prevent fluid 3 from coming in contact therewith. Additionally, as shown best in FIG. 2, reservoir 2 has a diameter greater than that of tank 4.

Tank 4 is an enclosed container preferably made of a non-corrosive material such as a plastic material. As shown best in FIG. 3, top 5 of tank 4 is recessed from the upper edge of tank 4 to form an annular flange 6 at the top of tank 4. Flange 6 includes an opening therein for receiving an air operated vacuum pump in the form of a venturi 7. Venturi 7 is of the conventional type having an inlet 8 and an outlet 9. Venturi 7 includes a short flared end connected to outlet 9 and a long flared end connected to inlet 8 with a constricted middle therebetween. Inlet 8 may be connected via a flexible hose 8a to a source of pressurized air, which is commonly found in shop areas of automotive repair shops, filling stations and the like to produce a suction or vacuum at its constricted middle, as is conventional. Preferably, venturi 7 should be constructed so as to permit a vacuum of between about 25 to about 27 inches of mercury. As shown best in FIG. 4, the constricted middle of venturi 7 is connected via mating ports 10, 11 in venturi 7 and top 5 respectively, to tank 4. Thus, as air passes through venturi 7, venturi 7 produces a vacuum inside of tank 4.

As shown best in FIG. 1, tank 4 also includes a sight tube or hose 12 made of a transparent material. Sight tube 12 enables an operator to visually determine the level of fluid or liquid contained within tank 4. Sight tube 12 is connected at one end near the top of tank 4 and at its other end near the bottom of tank 4. Thus, if one desires to drain tank 4 into reservoir 2, sight tube 12 is disconnected at its lower end thus permitting the fluid within tank 4 to drain by gravity into reservoir 2.

As seen best in FIGS. 1 and 2, tank 4 is mounted within reservoir 2 by means of a support bracket 13. Support bracket 13 includes three offset or bent legs 14–16 each of which has one end connected to reservoir 2 and its other end connected to the ends of the remaining legs to form a common joint for supporting tank 4 within reservoir 2. Thus, legs 14–16 form a recessed area that receives and supports tank 4, and as best shown in FIG. 2, supports tank 4 in an eccentric location within reservoir 2.

Figure 3:
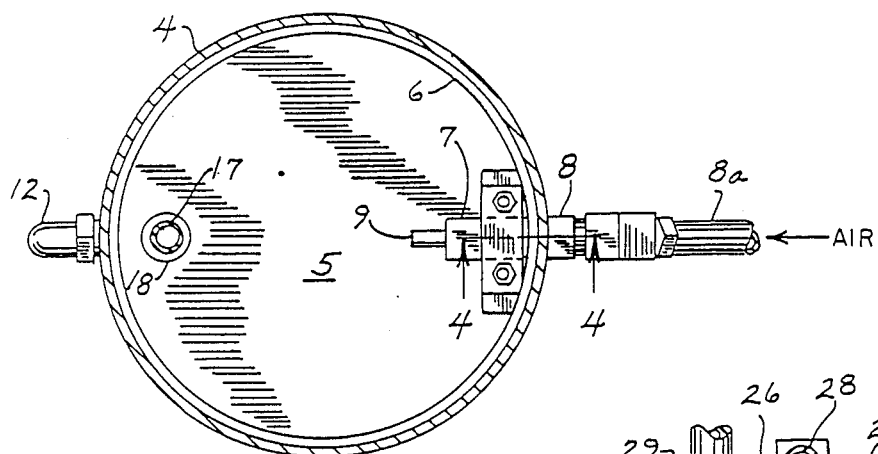
FIG. 3 is a cross sectional view taken along the plane of the line 3—3 in FIG. 1.
Figure 4:
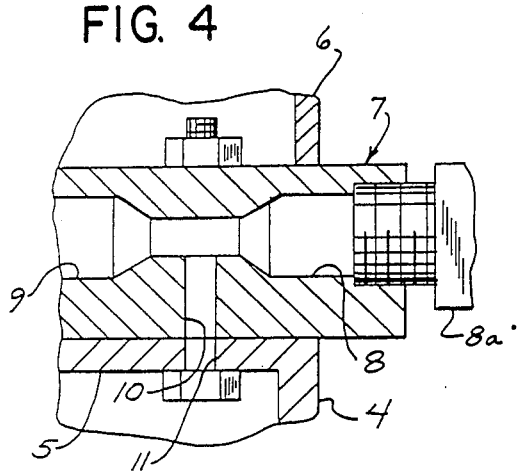
FIG. 4 is a cross sectional view taken along the plane of the line 4—4 in FIG. 3.
Figure 5:
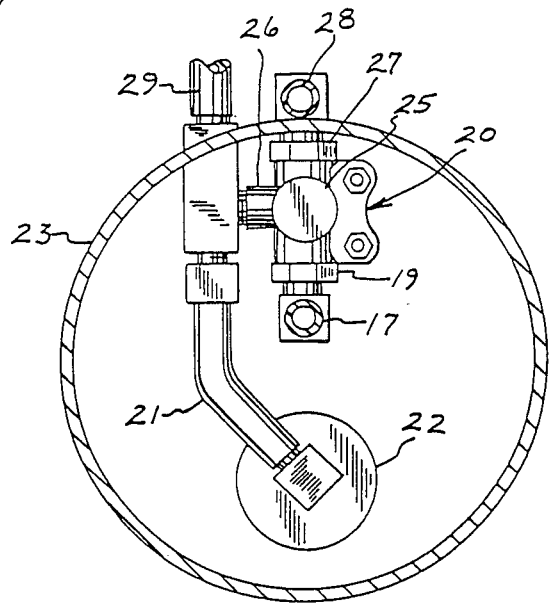
FIG. 5 is a cross sectional view taken along the plane of the line 5—5 in FIG. 1.
Figure 6:
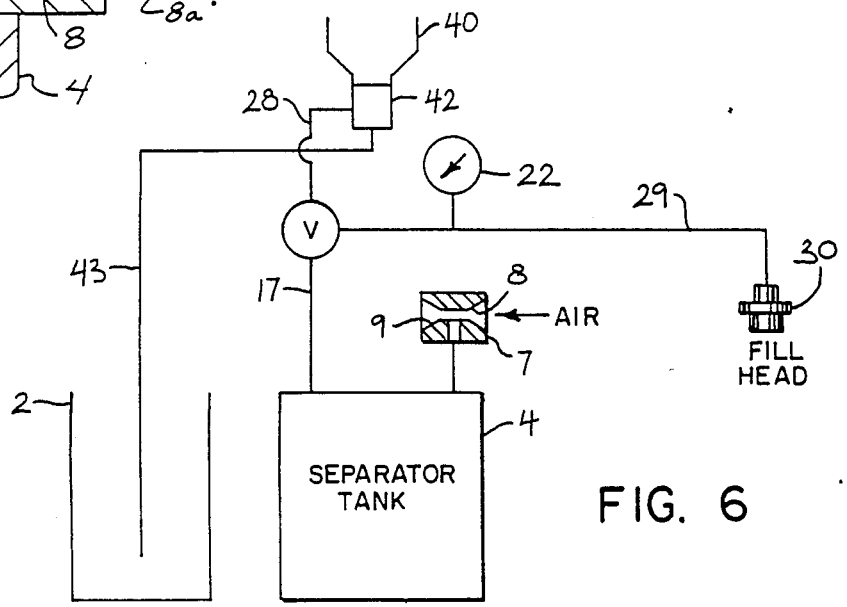
FIG. 6 is a schematic diagram illustrating the circuitry of the evacuation unit of FIG. 1.

As shown best in FIG. 3, top 5 of tank 4 also includes an opening therein located opposite of venturi 7 which houses a flexible hose 17 in fluid tight relationship by means of seal 18. As shown in FIG. 5, the opposite end of hose 17 is connected to one port 19 of a three way valve 20. Port 19 of valve 20 as well as hose 17 is also connected via hose 21 to a vacuum gauge 22 housed in tank cover 23. Gauge 22 thus provides a measure of the vacuum within unit 1 at any given point in time.

As shown best in FIGS. 2 and 5, control valve 20 is housed in tank cover 23 opposite gauge 22 and includes an operating lever 24 on the outside of cover 23 which manually controls the position of a spool within valve body 25 with respect to ports 19, 26 and 27. Port 27 is connected via a flexible transparent hose 28 to a sequence valve 42 while port 26 is connected via a transparent hose 29 to an access port of the closed fluid system, typically the radiator cap opening of an automotive coolant system. As shown best in FIG. 1, one end of hose 29 includes a filler head 30 for attachment to the access port of the fluid system, while the other end of hose 29 is connected to outlet port 26 by means of a coupling 31. Coupling 31 may be of the "quick disconnect" type to facilitate use of dedicated service hoses typically found in automobile repair and service shop locations. Filler head 30 is of the type that may be releasably and sealingly connected to the access port of a closed fluid system, and as shown best in FIG. 1 may be of the type which includes a resilient rubber membrane 32 which is flexed outwardly as a nut 33 is turned down upon a threaded shaft 34 so that membrane 32 sealingly engages the access port.

Another flexible transparent hose 43 communicates between fluid 3 and sequence valve 42. As shown best in FIGS. 7 and 8, sequence valve 42 is located in the bottom of primary reservoir 40 and includes a body 44 having an outlet port 45 communicating with hose 28, a first inlet port 46 communicating with hose 43 leading to secondary reservoir 2, and a second inlet port 47 leading to the interior of primary reservoir 40. Sequence valve 42 also includes a valve plate 48 extending across inlet port 47, a spool 49 and an actuating rod 50. Valve plate 48 includes an orifice 51 formed therethrough and is connected for movement in an axial direction with spool 49 and rod 50. Spool 49 includes a first sealing member 52 for sealing engagement with inlet port 47, as shown in FIG. 8, and a second sealing member 53 located at its lower end for sealing engagement with port 45, as best shown in FIG. 7. Plate 48, spool 49 and rod 50 are all biased to their raised positions as shown in FIG. 8 by means of a spring 54 which bears against the lower face of plate 48 and an annular shoulder 55 formed in inlet port 47. Thus, valve plate 48 is movable between a depressed position shown in FIG. 7 wherein port 46 is closed and outlet port 45, and port 47 are open, and a raised position shown in FIG. 8 wherein inlet port 47 is closed and ports 45 and 46 are open. Plate 48 is actuated between its upward and downward positions by means of manually moving rod 50 at the desired time.

In operation, and assuming it is first desired to purge substantially all entrained air from a closed hydraulic fluid system such as the hydraulic brake system of an automobile, hose 29 is connected to port 26 and filler head 30 is replaced by another standard coupling which is connected to an access port of the hydraulic system. Preferably, the access port would be at or adjacent the brake pads and wheels. Next, a source of air under pressure is attached via hose 8a to inlet 8 of venturi 7, and valve 20 is positioned substantially as shown in FIG. 2 to interconnect ports 26 and 19. The air under pressure is then permitted to pass through venturi 7 to create a suction or vacuum within tank 4, hose 17, port 19, port 26 and hose 29 so that hydraulic fluid is drawn from the fluid system into hose 29 through ports 26 and 19, and then into tank 4 via hose 17. Once in tank 4, the hydraulic fluid with entrained air therein is separated to produce a liquid hydraulic fluid phase and a gaseous air phase. Simultaneously as the hydraulic fluid is withdrawn from the fluid system fresh hydraulic fluid may be replenished into the system via the master cylinder in the engine compartment of the automobile or truck. The evacuation is continued until an operator determines that substantially all bubbles or entrained air is removed from the hydraulic fluid. This is accomplished by observing in transparent hose 29 when the fluid no longer contains entrained air bubbles. At this point in time, the pressurized air is turned off, and hose 29 is disconnected from the fluid system.

If one desires to test the fluid tightness of a closed fluid system, such as an automotive engine coolant system, and to refill the system with fresh fluid, one first drains the fluid system of the fluid or coolant therein and then connects one end of hose 29 to port 26 of valve 20 and sealingly connects filler head 30 within the radiator cap opening. Air under pressure is then connected to venturi 7 and valve 20 is positioned substantially as shown in FIG. 2. The air under pressure is then passed through venturi 7 to create a suction or vacuum within the fluid coolant system, substantially as described above. When gauge 22 indicates that a vacuum of about 25 to about 27 inches of mercury has been created within the fluid system, valve lever 24 is moved to a test position. As shown best in FIG. 2, lever 24 is rotated in a counterclockwise direction 90° with respect to the position shown in solid lines so that hose 29 and the fluid system are isolated from the remainder of the vacuum unit to test for fluid tightness. Thus, after discontinuing application of the vacuum on the system an operator observes whether there is any pressure increase in the system by observing the needle of gauge 22. If the needle drops, this indicates a leak in the system.

If on the other hand no leaks are determined to be in the system, the system may be refilled through the radiator cap opening without disconnecting the evacuation unit of hose 29. In order to accomplish this, valve or lever 24 is rotated in a clockwise direction 90° from the position shown in FIG. 2 so that port 26 is now connected and communicates with port 27. Port 27 in turn communicates via hose 28 with port 45 of sequence valve 42 and then to fresh coolant system fluid 41 in reservoir 40. Immediately after the fill apparatus selector valve lever 24 is placed in the fill position, the reservoir sequence valve actuating rod 50 is manually depressed to the position of FIG. 7. The liquid 41 in the primary reservoir 40 is under atmospheric pressure and therefore acts upon valve plate 48 holding valve plate 48 in this downward position. Liquid 41 in the primary reservoir 40 then flows through orifice 51 in valve plate 48 and out of the valve through port 45. At this point port 46 is closed off by sealing member 53 of valve spool 49. Since fluid 41 is at atmospheric pressure, fluid 41 is forced through hose 28, ports 27 and 26, and then through hose 29 and into the coolant system. As refilling occurs, gauge 22 will indicate that vacuum within the fluid system is reducing i.e. the pressure is increasing within the system. When the vacuum falls to about 15 inches of mercury, valve lever 24 is once again moved to the position shown in solid lines in FIG. 2 to once again produce a vacuum on the system to a predetermined vacuum of about 25 to about 27 inches of mercury. This typically occurs when the system is approximately half filled with fresh system fluid. As vacuum is once again applied to the sytem, entrained air is removed from the coolant in the manner previously described above so that substantially all entrained air is removed from the fresh coolant being used to fill the system. Finally, valve lever 24 is once again moved to its fill position to communicate ports 26 ane 27 so that atmospheric pressure once again forces the coolant into the system, as previously described, until the system is filled the desired amount. At this point in time, the vacuum within the system falls to approximately 1 inch of mercury.

When liquid 41 in the primary reservoir 40 is depleted, a small amount of air is drawn through the valve plate orifice 51. The momentary drop in vacuum inside valve 42 allows the spring 54 to shift the valve upward to the raised position of FIG. 8.

The flow path between the primary reservoir 40 and port 45 is now blocked, and a flow path between the secondary reservoir 2 connected to port 46 is established with port 45. Any remaining liquid necessary to fill the system is supplied by atmospheric pressure forcing liquid 3 from secondary reservoir 2.

Various modes of carrying out the invention are contemplated as being within the scope of the following claims particularly pointing out and distinctly claiming the subject matter regarded as the invention.

I claim:

1. An evacuation unit for testing the fluid tightness of a closed fluid system having an access port and for filling the system with fluid through said access port, comprising:
   a first reservoir containing a first fluid;
   a second reservoir containing a second fluid;
   sequence valve means disposed between and communicating with said first and second reservoirs for selective positioning between a first position communicating said first reservoir with an outlet and a second position communicating said second reservoir with said outlet;
   vacuum pump means for producing a vacuum of a predetermined pressure less than atmospheric pressure, said vacuum pump means includes a source of air under pressure, a venturi, and conduit means interconnecting said pressurized air source and said venturi;
   connection means for releasable and sealable connection to an access port of a closed fluid system, said connection means includes a flexible hose having opposite ends, a filler head on one end of said hose for attachment to said access port, and coupling means on the other end of said hose;
   control valve means disposed between said coupling means and said vacuum pump means for selective positioning between a first position communicating said vacuum pump means with said connection means to produce a vacuum in the system, a second position isolating said connection means and system to test for fluid tightness, and a third position communicating said outlet of said sequence valve means with said connection means for filling the system with said first and second fluids; and
   a separation tank disposed between said vacuum pump means and said valve means so that fluid drawn therein separates into a liquid phase and a gas phase to remove entrained gas from said fluid when said valve means is in said first position.

2. The evacuation unit of claim 1 wherein said sequence valve means automatically moves from said first position to said second position when said first reservoir is empty.

3. The evacuation unit of claim 2 wherein said sequence valve means comprises a body, a first inlet communicating with said first reservoir and said outlet, a second inlet communicating with said second reservoir and said outlet, a spool axially movable in said body to selectively open and close said inlets and said outlet, a spool actuating means for axially moving said spool, spring bias means for biasing said spool in said first position, and a valve plate connected to said spool for axial movement therewith between said positions.

4. The evacuation unit of claim 3 wherein said spring biasing means extends between said valve plate and an annular shoulder formed in said body.

5. The evacuation unit of claim 4 wherein said valve plate includes an opening formed therethrough.

6. Teh evacuation unit of claim 5 wherein said spool actuating means comprises a longitudinal rod member extending axially from said spool.

* * * * *

UNITED STATES PATENT AND TRADEMARK OFFICE
CERTIFICATE OF CORRECTION

PATENT NO. : 4,888,980
DATED : December 26, 1989
INVENTOR(S) : Raymond D. DeRome It is certified that error appears in the above-identified patent and that said Letters Patent is hereby corrected as shown below:

Claim 6, Col. 8, Line 45, delete "Teh" and substitute therefore --- The ---.

Signed and Sealed this

Ninth Day of April, 1991

*Attest:*

HARRY F. MANBECK, JR.

*Attesting Officer*     *Commissioner of Patents and Trademarks*